United States Patent
Medeiros et al.

(10) Patent No.: US 7,585,580 B1
(45) Date of Patent: Sep. 8, 2009

(54) DIRECT REACTING ANOLYTE-CATHOLYTE FUEL CELL FOR HYBRID ENERGY SOURCES

(75) Inventors: Maria G. Medeiros, Bristol, RI (US); Eric G. Dow, Barrington, RI (US); Steven P. Tucker, Portsmouth, RI (US); Russel R. Bessette, Mattapoisett, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1000 days.

(21) Appl. No.: 11/124,639

(22) Filed: May 4, 2005

(51) Int. Cl.
*H01M 8/10* (2006.01)
*H01M 8/00* (2006.01)

(52) U.S. Cl. .............................. 429/30; 429/13; 429/40; 429/44; 429/105

(58) Field of Classification Search ....................... None
See application file for complete search history.

(56) References Cited

U.S. PATENT DOCUMENTS

| | | | |
|---|---|---|---|
| 6,485,851 B1 | 11/2002 | Narayanan et al. | |
| 6,562,497 B2 | 5/2003 | Finkelshtain et al. | |
| 6,641,945 B2 | 11/2003 | Griffin | |
| 6,811,905 B1 * | 11/2004 | Cropley et al. | ................. 429/13 |
| 6,849,356 B2 * | 2/2005 | Dow et al. | ................... 429/105 |
| 2004/0072044 A1 | 4/2004 | Rusek et al. | |

* cited by examiner

*Primary Examiner*—John S Maples
(74) *Attorney, Agent, or Firm*—James M. Kasischke; Jean-Paul A. Nasser; Michael P. Stanley

(57) ABSTRACT

A fuel cell and a method for using the fuel cell to make electricity, in which the fuel cell has an anode half-cell having an electrocatalytic anode and a liquid anolyte that is substantially isopropanol dissolved in seawater. The fuel cell has a cathode half-cell having an electrocatalytic cathode and a liquid catholyte that is substantially hydrogen peroxide dissolved in slightly acidic seawater. The half-cells share a common proton exchange membrane. When the anode and cathode are in electrical connection the isopropanol is oxidized to carbon dioxide, which is fugitive, and the hydrogen peroxide is reduced to water. In the method, the anolyte and the catholyte, which are in effect the fuel of the fuel cell, are metered and re-circulated as needed to produce the necessary electrical power. The electrocatalytic electrodes are typically comprised of palladium and iridium alloys.

18 Claims, 2 Drawing Sheets

DIRECT REACTING ANOLYTE-CATHOLYTE FUEL CELL FOR HYBRID ENERGY SOURCES

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention relates generally to a fuel cell, and more particularly to a fuel cell wherein both the anolyte and the catholyte are liquids that can be utilized and stored externally to the cell stack.

(2) Description of the Prior Art

Direct methanol fuel cells (DMFC) have been under investigation for the past decade. These cells are comprised of a solution phase anolyte (methanol) undergoing oxidation on a catalytic surface at the anode, a membrane, and oxygen undergoing reduction on a catalyst at the cathode. Improvements have been made on power density, efficiency, cell stack, and life.

The electrochemical equations associated with the DMFC are:

$$\text{Anode: } CH_3OH+H_2O \rightarrow CO_2+6H^++6e^- \quad (1)$$

$$\text{Cathode: } 4H^++4e^-+\rightarrow O_2 \rightarrow 2H_2O \quad (2)$$

$$\text{Cell Reaction: } 2CH_3OH+3O_2 \rightarrow 2CO_2+4H_2O \quad (3)$$

The proposed mechanism for the oxidation of the methanol (equations 4-6) is described below and occurs as a two-step process, where the methanol ($CH_3OH$) oxidizes to form carbon dioxide ($CO_2$) via a carbon monoxide (CO) intermediate step (equation 5). The carbon monoxide is undesirable as it can poison the catalyst and lower voltages and efficiencies.

$$CH_3OH \rightarrow CO+4H^++4e^- \quad (4)$$

$$CO+H_2O \rightarrow CO_2+2H^++2e^- \quad (5)$$

$$CH_3OH+H_2O \rightarrow CO_2+6H^++6e^- \quad (6)$$

The advantages of DMFC cell stacks are that they are lightweight, compact, can operate at ambient temperatures, and run for thousands of hours. Typical voltages are 0.5V at 100 mA/cm2.

A major disadvantage in addition to CO catalyst poisoning of DMFC cell stacks is the crossover of the methanol across the membrane lowering cell voltages and fuel efficiency. Many studies have been conducted on membranes to minimize or eliminate this fuel crossover.

A further disadvantage is that the aforementioned DMFC requires molecular oxygen, which is difficult to store. Oxygen is stored as either a high-pressure gas or a very low temperature liquid. The critical temperature of oxygen is −118.6° C., and the critical pressure is 49.8 atm.

What is desired is a fuel cell that employs liquid fuels that can be stored externally to the cell stack. In U.S. Pat. No. 6,485,851, inventors Sekharipuram R. Narayanan, Thomas I. Valdez, William Chun, disclose a methanol-water fuel cell that employs a liquid oxidant, hydrogen peroxide.

U.S. Published Application 2004/0072044 A1, having inventors John Rusek and Daniel Prater, bearing serial, No. 10/269,046 teaches a direct hydrogen peroxide fuel cell utilizing a proton donating fuel, where the proton donating fuel is methanol. As shown, the hydrogen peroxide is added to the cathode side of the fuel cell, and methanol is added to the anode side of the fuel cell, producing an electric current and a flow of protons, i.e., proton transfer, through the anode/cathode membrane. Methanol and hydrogen peroxide solutions are added periodically to the anode and cathode sides of the fuel cell, usually by automatic computer control system.

SUMMARY OF THE INVENTION

Accordingly, it is an objective of the present invention to provide a fuel cell that employs liquid fuels that can be stored externally to the cell stack.

Another objective of the present invention is to provide a fuel cell that does not require molecular oxygen as a chemical component.

Another objective of the present invention is to avoid the crossover of an anolyte across the fuel cell membrane lowering cell voltages and fuel efficiency.

A further objective of the present invention is to avoid carbon monoxide (CO) catalyst poisoning.

These objectives are accomplished through the present invention, an electrochemical fuel cell comprised of a cathode half-cell and an anode half-cell having a common (shared) proton exchange membrane. The cathode half-cell is filled with a catholyte, which is comprised of a solution of an oxidant and seawater, and the anode half-cell is filled with an anolyte, which is comprised of a solution of a reductant and seawater. The oxidant is an acceptor of electrons and the reductant is a donor of electrons. The protons generated upon oxidation of the reductant move from the anode half-cell through the proton exchange membrane to the cathode half-cell, and electrons move from the electrocatalytic anode to the electrocatalytic cathode via an electrical connection over an electrical load.

BRIEF DESCRIPTION OF THE DRAWINGS

The foregoing invention will become readily apparent by referring to the following detailed description and the appended drawings in which.

DETAILED DESCRIPTION OF THE INVENTION

Figure 1:
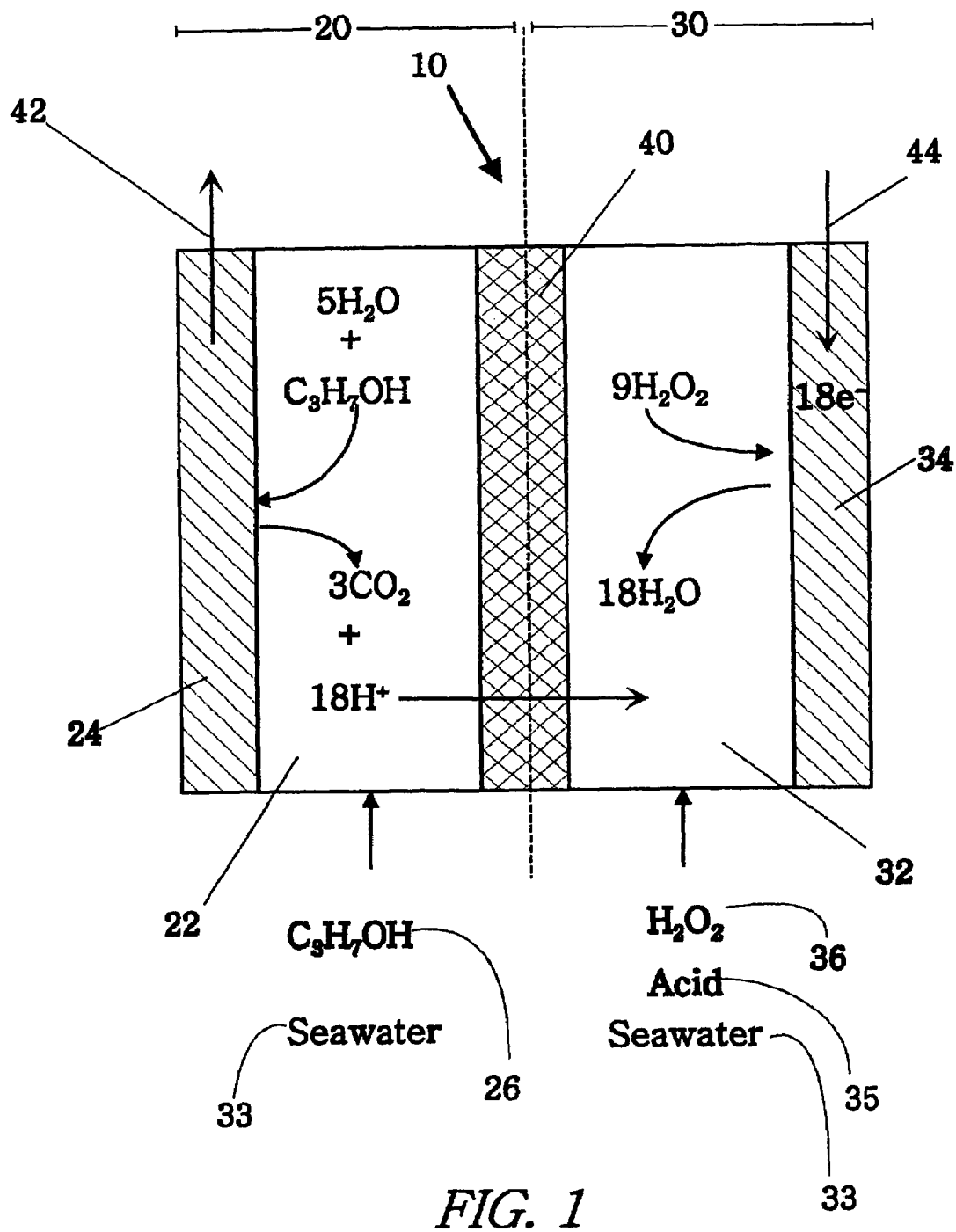
FIG. 1 is a schematic illustration of an embodiment of the invention illustrating a fuel cell having a proton exchange membrane a liquid oxidant and a liquid reductant in the presence of seawater, and a cathode and anode that serve as both catalytic surfaces and electrodes.

The invention is an electrochemical fuel cell 10 comprised of two half-cells 20, 30 separated by a proton exchange membrane (PEM) 40, an electrocatalytic anode 24, an electrocatalytic cathode 34, a liquid anolyte 22, comprised of a reductant dissolved in an aqueous solution capable of supporting electrical conductivity, such as seawater and a liquid catholyte 32, comprised of a oxidant dissolved in an aqueous solution capable of supporting electrical conductivity, such as seawater. Examples of other aqueous solutions capable of supporting electrical conductivity are solutions with salts such as sodium, potassium, calcium, magnesium and lithium. Examples of oxidants that are soluble in seawater are hydrogen peroxide, hypochlorite and hypochlorous-acid. Examples of reductants that are soluble in seawater are methanol, propanol, isopropanol, ethanol, acetone, oxalic acid, formic acid, formaldehyde, acetic acid, and acetaldehyde. Methanol and isopropanol are preferred reductants as they are relatively inexpensive, and the oxidation products are largely carbon dioxide and hydrogen ions. Isopropanol, when used in a fuel cell, produces three times as many electrons as methanol on a mole per mole basis. The methanol or isopropanol concentration in the anolyte solution is maintained at a selected level by injection of pure methanol or isopropanol into the anolyte flow stream from a reservoir of pure material. Hydrogen peroxide is a preferred oxidant as it is relatively inexpensive, it forms water upon reduction in the presence of hydrogen ions, and it is relatively safe to store and handle. Most importantly, when used in a fuel cell as a catholyte containing seawater, hydrogen peroxide has a much higher theoretical cell voltage than molecular oxygen, on the order of 1.7 V versus 0.5 V for molecular oxygen. The hydrogen peroxide concentration in the catholyte is maintained at a selected level by injection of 50% $H_2O_2$ into the catholyte flow stream from a reservoir of 50% $H_2O_2$. The anolyte 22 and the catholyte 32 are re-circulated and replenished as necessary. The catholyte 32, at least initially also contains a catalytic amount of acid 35.

Referring to FIG. 1, anolyte 22 is fed into the bottom of the anode half-cell 20, and the catholyte 32 is fed into the bottom of the cathode half-cell 30 of fuel cell 10. The anode half-cell 20 has an electrocatalytic electrode 24 comprised of a palladium and iridium catalytic surface. The cathode half-cell 30 also has an electrocatalytic electrode 34 comprised of a palladium and iridium catalytic surface. A preferred construction of the Pd/Ir electrode is described in U.S. Pat. No. 6,740,220. The palladium and iridium are simultaneously deposited on a carbon substrate to form a palladium iridium alloy. There is an electrical potential of 1.7 V between the anode and cathode, and when in electrical connection, the reducing agent of the anolyte 22, isopropanol 26, is oxidized to carbon dioxide 28, and the oxidizing agent of the catholyte 32, hydrogen peroxide 36, is reduced to water. The two half-cells are separated by a proton exchange membrane 40, wherein protons move across the membrane from the anode side to the cathode side.

The invented fuel cell is stoichiometrically described by the half-cell equations 7-8 and the full cell equation 9 for methanol and hydrogen peroxide, and half-cell equations 10-11 and the full cell equation 12 for isopropanol and hydrogen peroxide. Multiple fuel cells can be combined in series in a stacked formation producing a higher voltage, or combined in parallel increasing the amperage.

The following are the Methanol-Hydrogen Peroxide Seawater Electrochemical Reactions:

Anode: $CH_3OH+H_2O \rightarrow CO_2+6H^++6e^-$ (7)

Cathode: $6H^++6e^-+3H_2O_2 \rightarrow 6H_2O$ (8)

Cell Reaction: $CH_3OH+3H_2O_2 \rightarrow CO_2+6H_2O$ (9)

The following are the Isopropanol-Hydrogen Peroxide Seawater Electrochemical Reactions:

Anode: $C_3H_7OH+5H_2O \rightarrow 3CO_2+18H^++18e^-$ (10)

Cathode: $18H^++18e^-+9H_2O_2 \rightarrow 18H_2O$ (11)

Cell Reaction: $C_3H_7OH+9H_2O_2 \rightarrow 3CO_2+13H_2O$ (12)

As shown in the equations 10-12 above, when the reductant is oxidized it produces a proton, it also produces an electron, and when eighteen electrons and eighteen protons are produced, one molecule of isopropanol 26 (or another reductant like methanol) is oxidized to carbon dioxide 28. Carbon dioxide is only partially soluble in seawater, and it vents off as a gas as it is formed, therefore driving the reaction irreversibly toward the continued formation of carbon dioxide. On the cathode side 30 of the fuel cell 10, the arrival of electrons through the load and protons through the membrane 40 bring about the reduction of the hydrogen peroxide 36 to two moles of water. The catholyte 32 and the anolyte 22 are pumped into the fuel cell from ports that enter close to the bottom. In addition to seawater and hydrogen peroxide, the catholyte contains a small quantity of acid. The acid facilitates the conversion of the hydrogen peroxide to water.

Figure 2:
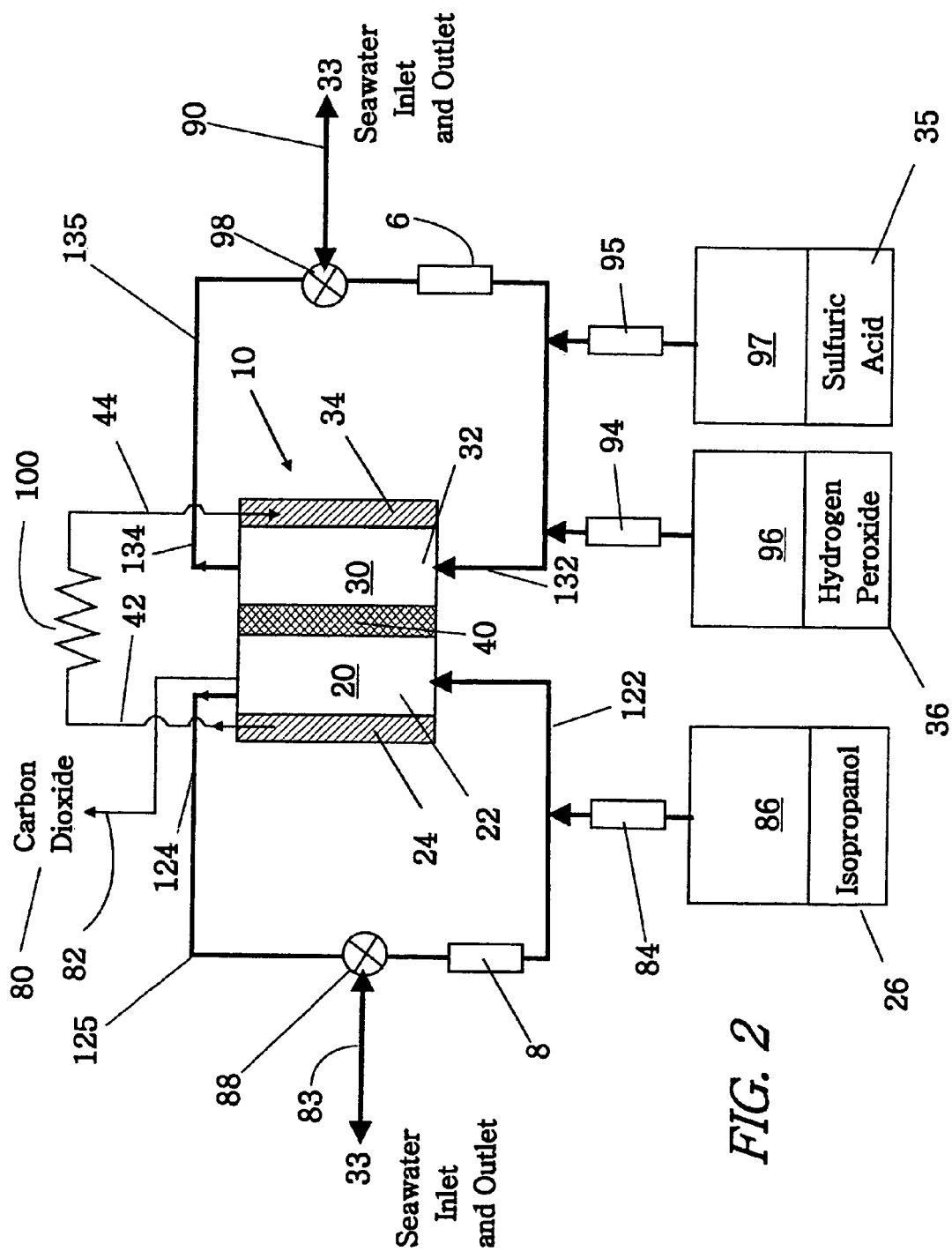
FIG. 2 is a schematic diagram illustrating the mechanical supporting elements and the chemical flow of the components of the fuel cell.

Referring to FIG. 2 is a schematic diagram illustrating the mechanical supporting elements and the chemical flow of the components of the fuel cell 10. The fuel cell 10 is connected across a load 100. The voltage across the load is about 1.7 V. The negative terminal 42 is connected to anode 24 and the positive terminal 44 is connected to the cathode 34. The anolyte 22 is prepared by combining isopropanol 26 with seawater 33. The isopropanol 26 is preferably stored as a substantially pure liquid fuel in storage tank 86. Seawater 33 is metered via pump 8 through line 83 through valve 88, and admixed with the isopropanol 26, which is metered by pump 84 from storage tank 86. The anode half-cell 20 is supplied anolyte through line 122 through the bottom of the cell. Static or dynamic mixers (not shown) can be included in line 122. In a similar fashion catholyte 32 is prepared using a metering process. Seawater 33 is metered in via pump 6 through line 90 through valve 98, and admixed with the hydrogen peroxide 36 that is metered by pump 94 from storage tank 96. The catholyte can additionally contain an acid 35, stored in tank 97 and metered into the stream by pump 95. The preferred concentration of hydrogen peroxide is approximately 50% by weight, where water makes up the balance. The preferred acid 35 is sulfuric acid. Substantially pure sulfuric acid is about 96% by weight. The preferred concentration of the sulfuric acid is limited by the ability to accurately meter in small quantities of acid into a relatively large stream of seawater. The catholyte 32 enters the cathode half-cell 30 through line 132. Static or dynamic mixers (not shown) can be included in line 132. The anolyte exits the half-cell 20 via line 124 and is re-circulated via return line 125. As the reductant, isopropanol 26, is consumed, it is converted to carbon dioxide 28. Carbon dioxide is vented via line 82. Spent anolyte can be discharged through line 83, or refurbished through the addition of additional isopropanol 26 as needed. The vented carbon dioxide can be diffused into the ambient seawater or trapped in an alkali medium. The catholyte 32 exits the half-cell 30 via line 134, and is re-circulated via return line 135. As the oxidant, hydrogen peroxide 36, is consumed it forms water. Spent catholyte can be discharged through line 90, or refurbished with additional hydrogen peroxide 36. In a shut down mode the half-cells can be flushed with seawater, fresh water and drained dry.

The PEM 40, as shown in FIG. 1, is selected to be inert to oxidants, like hydrogen peroxide. Polymeric film material comprised of perfluorinated sulfonic acid polymer, or a copolymer of tetrafluoroethylene and perfluorovinylether sulfonic acid, resist oxidation and allow the exchange of protons. The PEM 40 is modified to have improved wettability. The fuel cell 10 can achieve full power from a dry state in less than 5 minutes.

Typically, the fuel cell is operated in a controlled temperature environment of about 25-50° C. High temperatures will cause the hydrogen peroxide to decompose to molecular oxygen gas, which if vented could form a tract stream of bubbles. The concentration of the reductant/fuel is maintained between 0.1-1.0M, the concentration of the oxidant is maintained between 0.05-0.1M, and the acid concentration is 0.05-0.1M.

Furthermore, the invention is a method for producing electricity. The method comprises electrochemically reacting in an anode half-cell having an electrocatalytic anode, a liquid anolyte with a liquid catholyte in a cathode half-cell having an electrocatalytic cathode. Both the anolyte and the catholyte contain seawater. The half-cells share a common proton exchange membrane, and similar electrocatalytic electrodes. The liquid anolyte and the liquid catholyte are replenished as needed.

An advantage of the disclosed invention is that it can be refueled using conventional liquid fueling systems. Adoption of this system enables rapid turnaround and lower operating costs. The reductant can be stored as a neat liquid, a concentrated liquid, or mixed and metered as needed. Similarly, the oxidant can be stored as a neat liquid, a concentrated liquid, or mixed and metered as needed. In the case of hydrogen peroxide, the hydrogen peroxide is preferably stored as a concentrated aqueous solution, which is mixed and metered as needed. The catholyte preferably initially contains a catalytic amount of acid to jump start the fuel cell.

The invention provides a source of electricity that is particularly adaptable for underwater vehicles and applications, such as unmanned underwater vehicles (UUVs). The fuel and oxidizer can be stored at ambient temperatures as liquids, and as such provide a system having greater safety and handling, than one that uses a compressed gas or a cryogenic liquid. Another advantage is that the fuel cell can be configured such that it can operate with a minimal exhaust stream, and will therefore be difficult to detect in an underwater environment.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. A fuel cell comprising:
   an anode half-cell having an electrocatalytic electrode and a liquid anolyte comprising a reductant dissolved in an aqueous solution that supports electrical conduction;
   a cathode half-cell having an electrocatalytic electrode and a liquid catholyte comprising an acid and an oxidant dissolved in an aqueous solution that supports electrical conduction; and
   a proton exchange membrane separating said anode half-cell from said cathode half-cell.

2. The fuel cell, as claimed in claim 1, wherein said reductant is selected from the group consisting of methanol, isopropanol, propanol, ethanol, acetone, oxalic acid, formic acid, formaldehyde, acetic acid, and acetaldehyde.

3. The fuel cell, as claimed in claim 2, wherein said reductant is isopropanol.

4. The fuel cell, as claimed in claim 1, wherein said oxidant is selected from the group consisting of hydrogen peroxide, hypochlorous acid, and hypochlorite.

5. The fuel cell, as claimed in claim 4, wherein said oxidant is hydrogen peroxide.

6. The fuel cell, as claimed in claim 1, wherein said electrocatalytic anode is comprised of a palladium and iridium alloy.

7. The fuel cell, as claimed in claim 1, wherein said electrocatalytic cathode is comprised of a palladium and iridium alloy.

8. The fuel cell, as claimed in claim 1, wherein said proton exchange membrane is comprised of a polymeric film material that is resistant to oxidation.

9. The fuel cell, as claimed in claim 1, wherein said aqueous solution that supports electrical conduction is a solution of water containing a salt selected from the group consisting of sodium, potassium, calcium, magnesium and lithium.

10. The fuel cell, as claimed in claim 1, wherein said aqueous solution that supports electrical conduction is seawater.

11. The fuel cell, as claimed in claim 1, wherein said anode half-cell is replenished as needed with liquid reductant from a reservoir.

12. The fuel cell, as claimed in claim 1, wherein said cathode half-cell is replenished as needed with hydrogen peroxide oxidant from a reservoir.

13. The fuel cell, as claimed in claim 1, wherein the anolyte and cathode are re-circulated.

14. The fuel cell, as claimed in claim 1, wherein said anode half-cell has a vent for releasing carbon dioxide gas.

15. A fuel cell comprising:
   an anode half-cell having an electrocatalytic anode and a liquid anolyte comprised of isopropanol dissolved in seawater;
   a cathode half-cell having an electrocatalytic cathode and a liquid catholyte comprised of an acid and hydrogen peroxide dissolved in seawater; and
   a proton exchange membrane.

16. A method for producing electricity, said method comprising:
   electrochemically reacting in an anode half-cell having an electrocatalytic anode, a liquid anolyte, comprised of a reductant dissolved in seawater, with a liquid catholyte, comprised of an acid and an oxidant dissolved in seawater in a cathode half-cell having an electrocatalytic cathode, wherein said anode half-cell and said cathode half-cell share a common proton exchange membrane;
   replenishing the liquid anolyte as needed; and
   replenishing the liquid catholyte as needed.

17. The method for producing electricity, as claimed in claim 16, wherein said reductant is selected from the group consisting of methanol, isopropanol, propanol, ethanol, acetone, oxalic acid, formic acid, formaldehyde, acetic acid, and acetaldehyde.

18. The method for producing electricity, as claimed in claim 16, wherein said oxidant is selected from the group consisting of hydrogen peroxide, hypochlorous acid, and hypochlorite.

* * * * *